(12) United States Patent
Chen

(10) Patent No.: US 11,267,169 B2
(45) Date of Patent: Mar. 8, 2022

(54) PROCESSING METHOD FOR MOLDING FOAMED POLYMER

(71) Applicant: OTRAJET INC., Taichung (TW)

(72) Inventor: Ching-Hao Chen, Taichung (TW)

(73) Assignee: OTRAJET INC., Taichung (TW)

(*) Notice: Subject to any disclaimer, the term of this patent is extended or adjusted under 35 U.S.C. 154(b) by 290 days.

(21) Appl. No.: 15/647,150

(22) Filed: Jul. 11, 2017

(65) Prior Publication Data

US 2018/0339441 A1 Nov. 29, 2018

(30) Foreign Application Priority Data

May 23, 2017 (TW) .................................. 106116975

(51) Int. Cl.

| B29C 44/04 | (2006.01) |
|---|---|
| B29C 45/26 | (2006.01) |
| B29C 44/58 | (2006.01) |
| B29K 105/04 | (2006.01) |
| B29C 45/14 | (2006.01) |

(52) U.S. Cl.
CPC ............ B29C 44/04 (2013.01); B29C 44/586 (2013.01); B29C 45/14795 (2013.01); B29C 45/26 (2013.01); *B29C 44/585* (2013.01); *B29K 2105/04* (2013.01)

(58) Field of Classification Search
CPC . B29C 44/586; B29C 44/0446; B29C 44/585; B29C 45/14795; B29C 45/26; B29K 2105/04
See application file for complete search history.

(56) References Cited

U.S. PATENT DOCUMENTS

| 3,787,278 A | * | 1/1974 | Ready | ................. B29C 44/0446 |
|---|---|---|---|---|
| | | | | 428/218 |
| 3,793,415 A | * | 2/1974 | Smith | .................... B29C 44/083 |
| | | | | 264/45.2 |
| 5,547,621 A | * | 8/1996 | Naritomi | ............... B29C 44/083 |
| | | | | 264/328.7 |
| 6,146,562 A | * | 11/2000 | Hettinga | ............. B29C 44/0415 |
| | | | | 264/328.7 |

(Continued)

FOREIGN PATENT DOCUMENTS

| CN | 103128973 A | 6/2013 |
|---|---|---|
| DE | A3346441 C1 | 10/1985 |

(Continued)

*Primary Examiner* — Joseph S Del Sole
*Assistant Examiner* — Jerzi H Moreno Hernandez
(74) *Attorney, Agent, or Firm* — Guice Patents PLLC

(57) ABSTRACT

A processing method for molding a foamed polymer, which includes molding a mixture of a polymer material and a foaming agent in a space of a mould chamber into a molded article having a predetermined shape. The shape of the entire space of the mould chamber is an injection molding shape that is different from the shape of the molded article before the mould chamber is fully filled with the mixture, and a shape of at least one local part of the mould chamber is changed after the space of the mould chamber is fully filled with the mixture. An exterior peripheral surface of a substrate of a movable portion and an adjustment end face are located in a center portion of a first mould surface and are spaced apart from all outer edges of the first mould surface.

5 Claims, 4 Drawing Sheets

(56) References Cited

U.S. PATENT DOCUMENTS

| | | | |
|---|---|---|---|
| 6,358,446 B1* | 3/2002 | Clarke | B29C 33/306 |
| | | | 264/50 |
| 6,398,996 B1* | 6/2002 | Fang | A43B 13/20 |
| | | | 264/328.7 |
| 6,926,940 B2 | 8/2005 | Ozaka | |
| 2002/0094428 A1* | 7/2002 | Nomura | B29C 44/586 |
| | | | 428/297.4 |
| 2005/0181085 A1* | 8/2005 | Harada | B29C 44/083 |
| | | | 425/4 R |
| 2005/0285294 A1* | 12/2005 | Ozaka | B29C 44/0446 |
| | | | 264/51 |
| 2013/0328229 A1* | 12/2013 | Helming | B29C 44/0415 |
| | | | 264/41 |
| 2016/0039162 A1* | 2/2016 | Murphy | B29C 43/02 |
| | | | 521/170 |
| 2017/0239856 A1* | 8/2017 | Skinner | B29C 44/58 |

FOREIGN PATENT DOCUMENTS

| | | | | |
|---|---|---|---|---|
| DE | 202009002230 U1 | 4/2010 | | |
| FR | 2167344 A1 * | 8/1973 | | B29C 33/00 |
| JP | A1996090620 | 4/1996 | | |
| JP | H0890620 A * | 4/1996 | | |
| JP | 3519468 B2 | 12/2000 | | |
| JP | 2001501884 A | 2/2001 | | |
| JP | 2000334763 A | 12/2001 | | |
| JP | 2006095867 A * | 4/2006 | | B29C 44/585 |
| JP | 2011025450 A * | 2/2011 | | |
| JP | 2011025472 A * | 2/2011 | | |
| JP | WO2014175331 | 10/2014 | | |
| WO | WO2016023067 A1 | 2/2016 | | |

* cited by examiner

PROCESSING METHOD FOR MOLDING FOAMED POLYMER

BACKGROUND OF THE INVENTION

1. Field of the Invention

The present invention relates to a polymer processing technology, and in particular, to a processing method for molding a foamed polymer.

2. Description of the Related Art

The conventional polymer foaming technology is to generate bubbles within the polymer by using a forming agent in the manner of chemical reactions, thermal decomposition, or phase change, thereby forming a plurality of cells within the polymer to form a foam, which has a low density, a low cost, heat insulation, sound insulation, impact resistance, and other characteristics for use in industry.

It is indicated in the previous research that, properties of a foam are affected by the size and density of cells, and growth of the cells is associated with temperature, pressure, pressure relief rate, soaking time, and a diffusion coefficient of a foaming agent, wherein it is pointed out in a nucleation theory that, a greater pressure results in a larger pressure drop during an instant pressure relief, thereby decreasing a volume free energy, and making the foaming agent to enter a polymer substrate more easily. At the same time, the change of the pressure drop rate will cause changes in the density of cells, and it is also pointed out in the previous study that a positive correlation is provided between the pressure drop rate and the nucleation rate. In an experiment, when the pressure drop rate increases from 0.0162 MPa/s to 0.5 MPa/s, the density of the cells formed will increase by $10^6$ times. In view of the above, through the control over the pressure drop magnitude and rate, the size and the density of the cells are changed. However, in the prior art, although the control over the pressure drop magnitude and rate can change the size and the density of the cells in the interior of the foam, the control is performed for the foam integrally. Therefore, the density and size of the cells formed are merely in a single distribution, and it is difficult to form cells having different sizes or different densities in the interior of the foam entirety manufactured in the same molding procedure.

Moreover, in order to make the interior of the foam have cells of difference sizes, the prior patent application CN 103128973 has disclosed melting a polymer material and molding into a primary blank, placing into an autoclave, then injecting a supercritical fluid into the autoclave; and after respectively maintaining for a certain time duration at a lower foaming temperature and a higher saturation temperature, performing rapid pressure relief, thereby forming cells of different sizes in the interior of the foam and enhancing several properties of the foam. Therefore, although the technology of generating cells of different sizes in the interior of the foam by means of a synergistic effect between pressure relief and temperature rising can achieve its purpose, the autoclave is necessarily required in the technology and a large amount of energy is cost for regulating temperature, so that the technology is not economic. At the same time, although cells of different sizes can be formed in the interior of the foam, the cells having different sizes are still distributed in the interior of the foam entirety, and cannot be distributed in different blocks of the foam in a controlled manner.

SUMMARY OF THE INVENTION

Therefore, the major objective of the present invention is to provide a processing method for molding a foamed polymer, which enables the foamed polymer to have cells of different sizes or different densities in different block sections of an once-forming foam entirety, such that different block sections of the foam entirety have properties that are different from one another.

In view of the above, in order to achieve the above purpose, the processing method for molding a foamed polymer provided by the present invention comprises accommodating a mixture of a polymer material and a foaming agent in a space of a mould chamber provided by a mould and molding into a molded article having a predetermined shape. The technical features thereof lie in that the space of the mould chamber has an injection molding shape that is different from the shape of the molded article before the space is fully filled with the mixture, and a shape of a local part of the space of the mould chamber is changed after the space of the mould chamber is fully filled with the mixture, such that the shape of the space of the mould chamber is changed from the injection molding shape to a molding shape that is the same as the molded article. Thereby, a surface force exerted on the accommodated mixture is changed by means of a volume alteration of the local part caused by the change in the shape of the local part of the space of the mould chamber.

Wherein, the change of the surface force is caused by means of position alteration of a chamber wall of the local part having a changed shape of the space of the mould chamber.

Wherein, the change in the shape of the local part of the space of the mould chamber results in an increase of the volume of the local part, thereby decreasing the surface force exerted.

Wherein, the change in the shape of the local part of the mould chamber results in a decrease of the volume of the local part, thereby increasing the surface force exerted.

In order to make the properties possessed by the different block sections of the entirety of the molded article to meet the requirements in actual use, a plurality of local parts having shapes changed of the mould chamber is provided, and the volume alteration of the plurality of local parts having shapes changed may be increasing or decreasing at the same time or ma king a part decrease or the rest increase.

In addition, the foaming agent may be a chemical or physical foaming agent, wherein, a mixture of a supercritical fluid as a foaming agent and a polymer material as a single-phase solution can be used as a specific preferred application example of the present invention.

DETAILED DESCRIPTION OF THE PREFERRED EMBODIMENTS

Herein, preferred embodiments of the present invention are given and illustrated in detail with reference to drawings.

Figure 1:
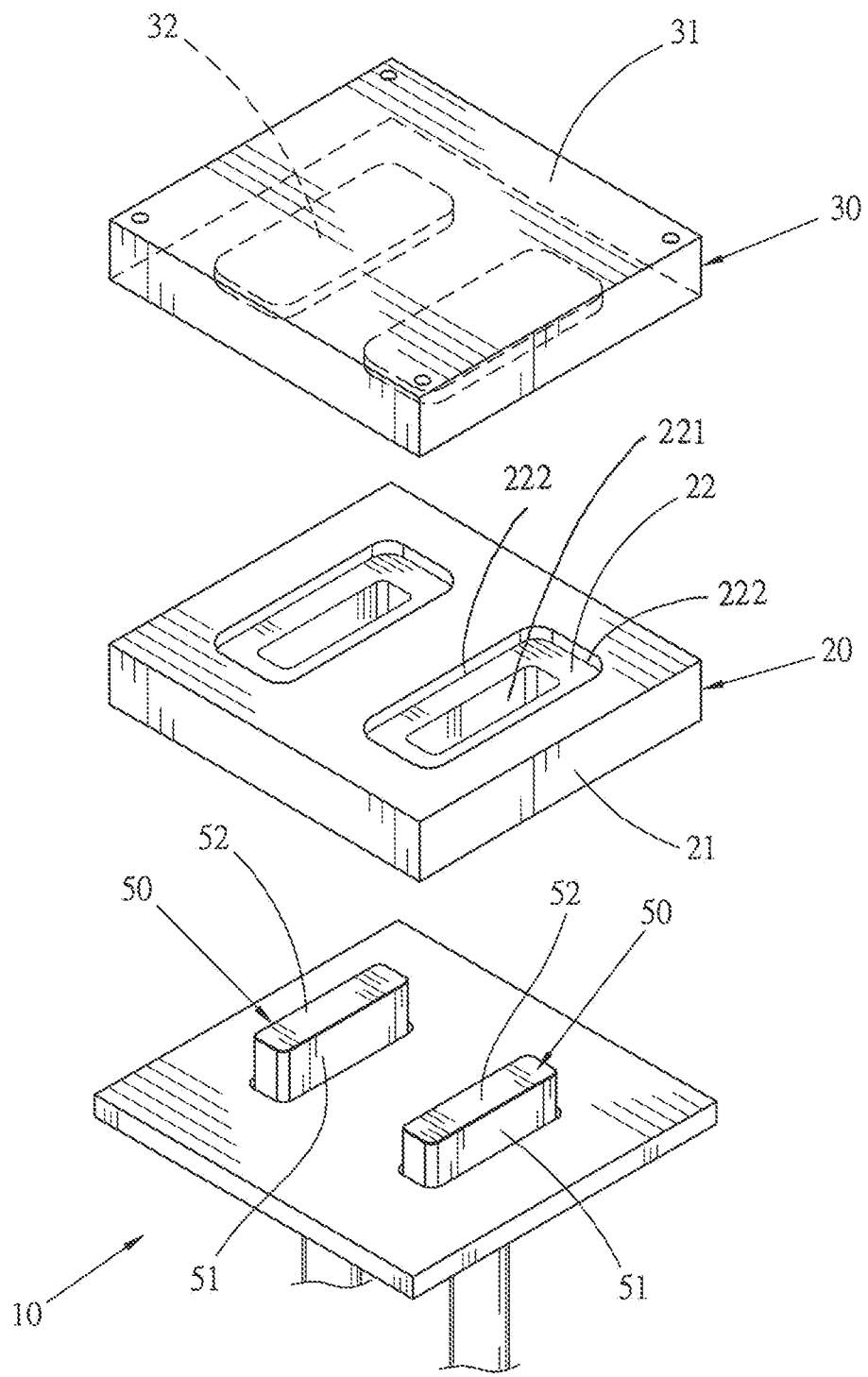
FIG. 1 is an exploded view of a mould according to a preferred embodiment of the present invention.
Figure 2:
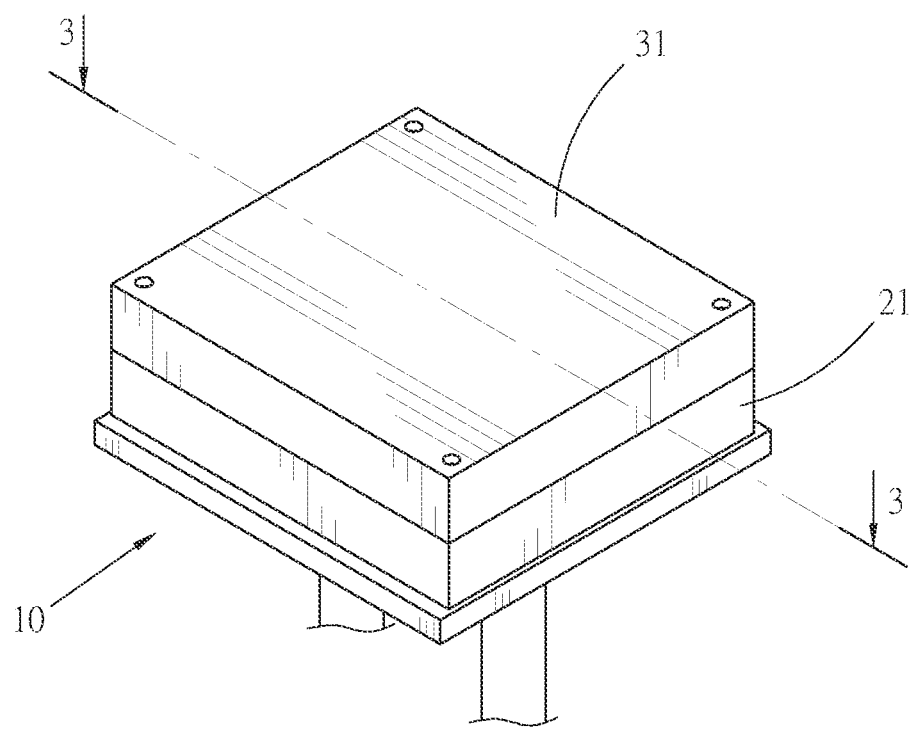
FIG. 2 is a stereo diagram of a mould according to a preferred embodiment of the present invention.
Figure 3:
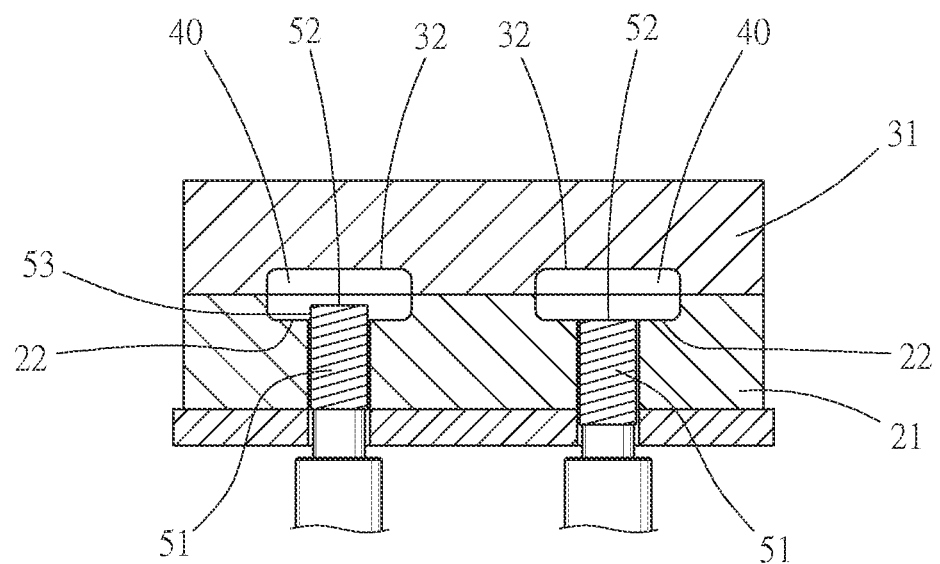
FIG. 3 is a cutaway view of a mould according to a preferred embodiment of the present invention.

Firstly, with reference to FIG. 1 to FIG. 3, the processing method for molding a foamed polymer provided in a preferred embodiment of the present invention is implemented by a mould (10), the mould (10) is a conventional multi-layer mould in a polymer molding formation processing technology, includes in structure, a first mould body (20), a second mould body (30), two mould chambers (40), and two movable portions (50).

The first mould body (20) has a plate-like first body part (21), and a first mould surface (22) is located on a side panel of the first body part (21).

The second mould body (30) has a plate-like second body part (31), and a second mould surface (32) is located on a side panel of the second body part (31).

Wherein, the first mould body (20) and the second mould body (30) are relatively displaceable between a mold closing position and a mold opening position. At the mold closing position, the first mould body (20) and the second mould body (30) are attached to each other in an overlapping manner by making the first mould surface (22) facing to the second mould surface (32), and each of the mould chambers (40) is formed between the first mould surface (22) and the second mould surface (32), and the mould chambers (40) are in a closed state; and at the mold opening position, the first mould body (20) and the second mould body (30) are separated from each other, thereby making the first mould surface (22) far away from the second mould surface (32) such that the mould chambers (40) are in an opening state.

The movable portions (50) respectively have a block-shaped substrate (51), slidably arranged in the first body part (21), and reciprocally displaceable between an injection molding position and a molding position, and an adjustment end face (52) located on one side of the substrate (51), and adjacent to the first mould surface (22).

In a mold closing state in which the first mould body (20) and the second mould body (30) are at the mold closing position, when the substrates (51) are at the molding position, as the movable portion shown in FIG. 3 at the right side, each of the adjustment end faces (52) in conjunction with the first mould surfaces (22) respectively, constitutes a side wall of the mould chambers (40), and the mould chambers (40) have a molding shape that is the same as a preset molded product. On the contrary, when the substrate (51) is at the injection molding position, as the movable portion shown in FIG. 3 at the left side, the adjustment end face (52) protrudes out of the first mould surface (22), such that one side wall of the mould chamber (40) further includes, in addition to the first mould surface (22) and the adjustment end face (52), a peripheral block surface (53) located on the substrate (51) and adjacent to the adjustment end face (52), and then the shape of the space of the mould chamber (40) is an injection molding shape different from the molding shape.

Figure 4:
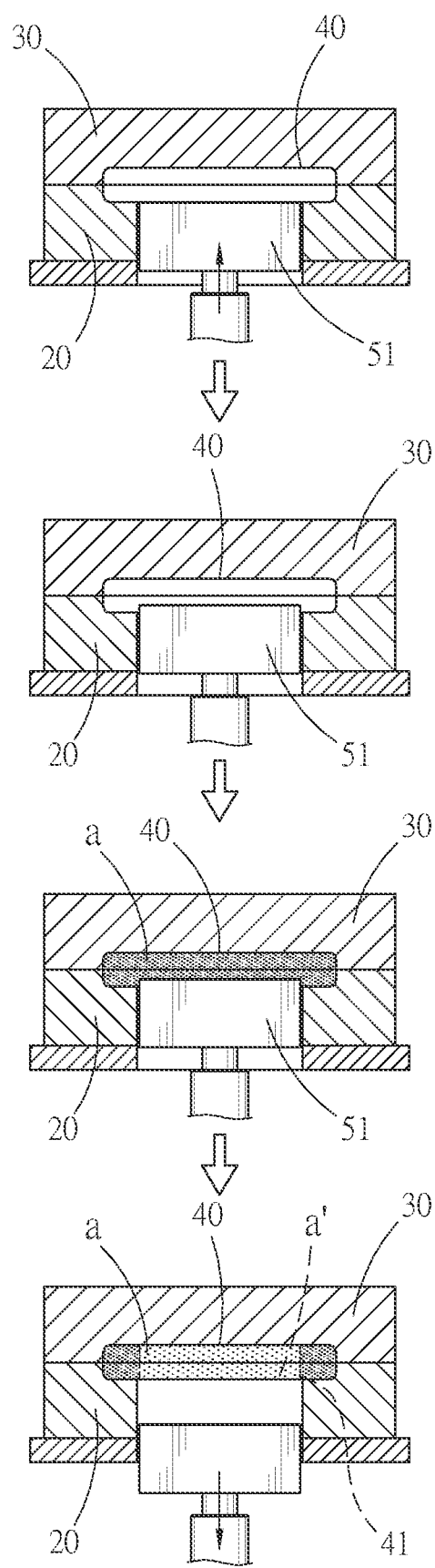
FIG. 4 is a schematic flow chart according to a preferred embodiment of the present invention.

Thereby, the processing method for molding a foamed polymer, during implementation, as shown in FIG. 4, arranges the substrate (51) at the injection molding position while making the first mould body (20) and the second mould body (30) be in a mold closing state, such that the shape of the space of the mould chamber (40) is the injection molding shape, and then by means of, for example, an exterior injection machine or an exterior extrusion machine, delivers a mixture (a) of the polymer material and the foaming agent that have been mixed into the mould chamber (40), until the space of the mould chamber (40) is fully filled. Afterwards, the substrate (51) moves from the injection molding position to the molding position, such that the substrate (51) settles into the first body part (21), to change a shape of a local part of the mould chamber (40) corresponding to the portion where the substrate (51) is located, such that the shape of the space of the mould chamber (40) is the molding shape, and with the substrate (51) settles into the first body part (21), the volume of a local section (41) of the mould chamber (40) is enlarged. As a result, a partial mixture (a') located in the local section (41) suffers less from the surface force exerted from the chamber wall of local section (41) of the mould chamber due to the increased volume of the local section (41). In the case where the surface force is decreased, the cells in the interior of the partial mixture (a') has a reduced resistance to cell nucleation or growth due to the reduced external pressure, and in this way, the molded product molded by the mould chamber (40) are altered according to the change in shape of the local section (41), such that cells of different sizes and different densities are formed in different parts of the entirety, so as to generate different properties, and then the molded product having multiple properties can be manufactured into a product such as a sports protector, which is made to form a multi-property protector having a preferable flexibility in the middle and a preferable hardness at the periphery, and possessing both the durability and protection effects. As shown in FIG. 1, the exterior peripheral surface (53) of the substrate (51) of the movable portion (50) and the adjustment end face (52) of the movable portion (50) are located in a center portion (221) of the first mould surface (22) and are spaced apart from all outer edges (222) of the first mould surface (22) that define an outer peripheral edge of the first mould surface (22).

The above disclosure is to make the entire volume of the mould chamber (40) when being in the injection molding shape less than the volume thereof when being in the molding shape, and take the increase of the volume of the local part of the mould chamber (40) as a result of change of the shape of the local part.

Figure 5:
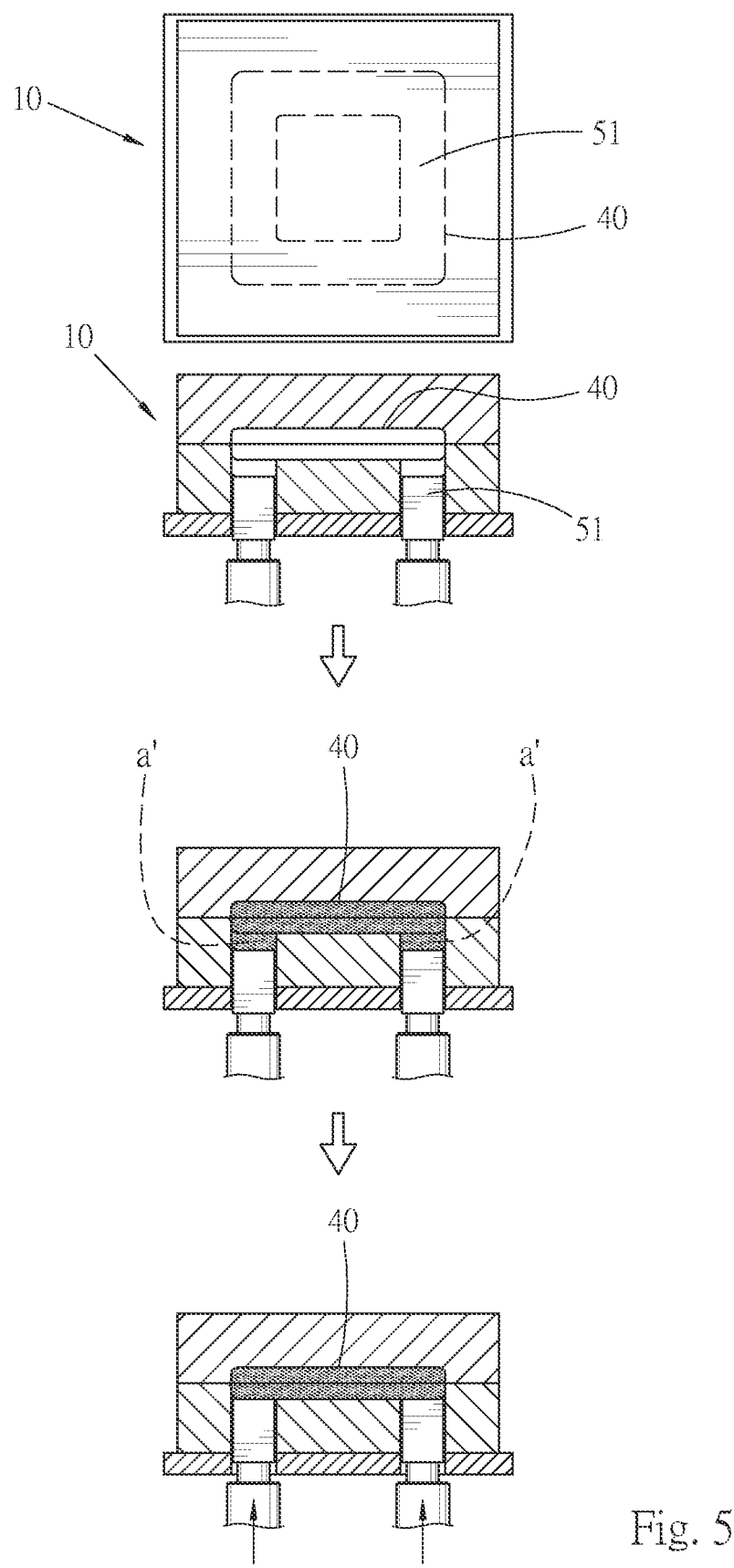
FIG. 5 is another schematic flow chart according to a preferred embodiment of the present invention.

On the contrary, the volume of the mould chamber in the injection molding shape can be made larger than the volume of the mould chamber in the molding shape. As specifically shown in FIG. 5, the space of the mould chamber (40) included in the mould (10) is in the injection molding shape, the hollow-frame-shaped substrate (51) is in a settling state, such that the volume of the mould chamber (40) is larger than the volume of the mould chamber (40) in the molding shape. Afterwards, by the position alternation due to rising of the substrate (51), the shape of the local section (41) of the mould chamber is altered, resulting in a decrease in the volume of the local section (41), thereby increasing the surface force exerted by the chamber wall of the local section (41) of the mould chamber to the partial mixture (a') accommodated therein, so as to increase the resistance to cell nucleation or growth in the interior of the partial mixture (a'), thereby achieving the effect of making the entirety of the molded product that is molded have different properties on different sections.

To sum up, in the processing method for molding a foamed polymer provided in the present invention, the types of the polymer material and the foaming agent in the mixture are not the critical technical content that majorly affects the achievement of the specific efficacies of the present invention. Furthermore, no matter whether the foaming agent adopts a chemical or physical one, there is no theoretical difference in nucleation and growth of bubbles. The present invention, through a fixed amount of mixture fully filling the mould chamber, the volume alternation of a part of volume caused by the change in the shape of the local part of the mould chamber, such as decreasing, increasing, or making a part decrease or the rest increase, can be conducted on a molded product to be molded having a specific shape at a specific position, so as to control the molded product to have expected properties at expected sections. Compared with the conventional technology, the technical content provided by the present invention can indeed effectively make up for the deficiencies in the conventional art, and enable the foamed polymer to have a wider application in the future.

REFERENCE NUMERALS OF ELEMENTS

(10) Mould, (20) First mould body, (21) First body part, (22) First mould surface, (30) Second mould body, (31) Second body part, (32) Second mould surface, (40) Mould chamber, (41) Local section, (50) Movable portion (51), Substrate, (52) Adjustment end face, (53) Peripheral block surface, (a) Mixture, (a') Partial mixture.

What is claimed is:

1. A processing method for molding a foamed polymer, which comprises molding a mixture of a polymer material and a foaming agent in a space of a mould chamber into a molded article having a predetermined shape, wherein, the shape of the entire space of the mould chamber is an injection molding shape that is different from the shape of the molded article before the mould chamber is fully filled with the mixture, and a shape of at least one local part of the mould chamber is changed after the space of the mould chamber is fully filled with the mixture, such that the shape of the entire space of the mould chamber is a molding shape that is the same as the molded article, and a surface force exerted on the accommodated mixture is changed by means of a volume alteration of the at least one local part caused by the change in the shape of the at least one local part of the mould chamber, the shape of the at least one local part is defined by a position of a movable portion;

wherein a mould comprises:

a first mould body, having a first mould surface;

a second mould body, connectable to the first mould body in an overlapping manner, and having a second mould surface facing to the first mould surface, wherein the mould chamber is located between the first mould surface and the second mould surface;

the movable portion, having a substrate, slidably arranged in the first mould body, and the substrate of the movable portion reciprocally moveable directly between an injection molding position and a molding position, and an adjustment end face located on one side of the substrate, and serving as a part for constituting a chamber wall of the mould chamber, wherein, when the substrate is located at the molding position, the shape of the space of the mould chamber is the molding shape, and when the substrate is located at the injection molding position, the shape of the space of the mould chamber is the injection molding shape;

wherein, when the substrate of the movable portion is located in the injection molding position, the mould chamber has a size that is defined by the first mould surface of the first mould body, the second mould surface of the second mould body, the adjustment end face of the substrate of the movable portion, and an exterior peripheral surface of the substrate of the movable portion being located adjacent to the adjustment end face;

wherein, when the substrate of the movable portion is located in the molding position, the mould chamber has a size that is defined by the first mould surface of the first mould body, the second mould surface of the second mould body, and the adjustment end face of the substrate of the movable portion;

wherein the exterior peripheral surface of the substrate of the movable portion and the adjustment end face of the substrate of the movable portion are located in a center portion of the first mould surface and are spaced apart from all outer edges of the first mould surface; and wherein, when the movable portion is located in the injection molding position, the adjustment end face of the substrate of the movable portion remains in a portion of the mould chamber that is located in the first mould body, and, when the movable portion is located in the molding position, the adjustment end face of the substrate of the movable portion remains in a portion of the mould chamber that is located in the first mould body;

wherein the size of the mould chamber is increased to a larger size mould chamber by moving the adjustment end face of the substrate of the movable portion and the substrate of the movable portion away from the mould chamber to a position located below the first mould surface of the first mould body.

2. The processing method for molding the foamed polymer according to claim 1, wherein, the at least one local part of the mould chamber has at least two local parts having shapes changed.

3. The processing method for molding the foamed polymer according to claim 1, wherein, the foaming agent is a physical foaming agent.

4. The processing method for molding the foamed polymer according to claim 3, wherein, the foaming agent is a supercritical fluid.

5. The processing method for molding the foamed polymer according to claim 1, wherein, when the substrate moves from the molding position to the injection molding position, the adjustment end face moves from the first mould surface to a direction facing to the second mould surface.

* * * * *